(12) United States Patent
Yeh

(10) Patent No.: US 10,133,028 B2
(45) Date of Patent: Nov. 20, 2018

(54) LENS ASSEMBLY

(71) Applicants: Sintai Optical (Shenzhen) Co., Ltd., ShenZhen, Guangdong Province (CN); Asia Optical Co., Inc., Taichung (TW)

(72) Inventor: Ching-Chung Yeh, Taichung (TW)

(73) Assignees: SINTAI OPTICAL (SHENZHEN) CO., LTD., Shenzhen, Guangdong Province (CN); ASIA OPTICAL CO., INC., Taichung (TW)

(*) Notice: Subject to any disclaimer, the term of this patent is extended or adjusted under 35 U.S.C. 154(b) by 5 days.

(21) Appl. No.: 15/600,860

(22) Filed: May 22, 2017

(65) Prior Publication Data

US 2018/0059362 A1    Mar. 1, 2018

(30) Foreign Application Priority Data

Aug. 29, 2016  (CN) .......................... 2016 1 0749802

(51) Int. Cl.
*G02B 9/00* (2006.01)
*G02B 9/64* (2006.01)
*G02B 1/00* (2006.01)
*G02B 1/04* (2006.01)
*G02B 13/00* (2006.01)
*G02B 27/00* (2006.01)

(52) U.S. Cl.
CPC .............. *G02B 9/64* (2013.01); *G02B 1/007* (2013.01); *G02B 1/041* (2013.01); *G02B 13/006* (2013.01); *G02B 13/0045* (2013.01); *G02B 27/0012* (2013.01); *G02B 27/0025* (2013.01)

(58) Field of Classification Search
CPC .......... G02B 9/64; G02B 1/007; G02B 1/041; G02B 27/0012; G02B 13/006; G02B 13/0045; G02B 27/0025
See application file for complete search history.

(56) References Cited

U.S. PATENT DOCUMENTS

2017/0371133 A1*   12/2017   Lai ..................... G02B 13/0045

* cited by examiner

*Primary Examiner* — Alicia M Harrington
(74) *Attorney, Agent, or Firm* — McClure, Qualey & Rodack, LLP

(57) ABSTRACT

A lens assembly includes a first lens, a second lens, a third lens, a fourth lens, a fifth lens, a sixth lens and a seventh lens, all of which are arranged in sequence from an object side to an image side along an optical axis. The first lens is a meniscus lens with negative refractive power and includes a convex surface facing the object side. The second lens is with negative refractive power and includes a concave surface facing the object side. The third lens is with positive refractive power and includes a convex surface facing the image side. The fourth lens is with positive refractive power. The fifth lens is with positive refractive power. The sixth lens is with negative refractive power. The seventh lens is with refractive power.

20 Claims, 12 Drawing Sheets

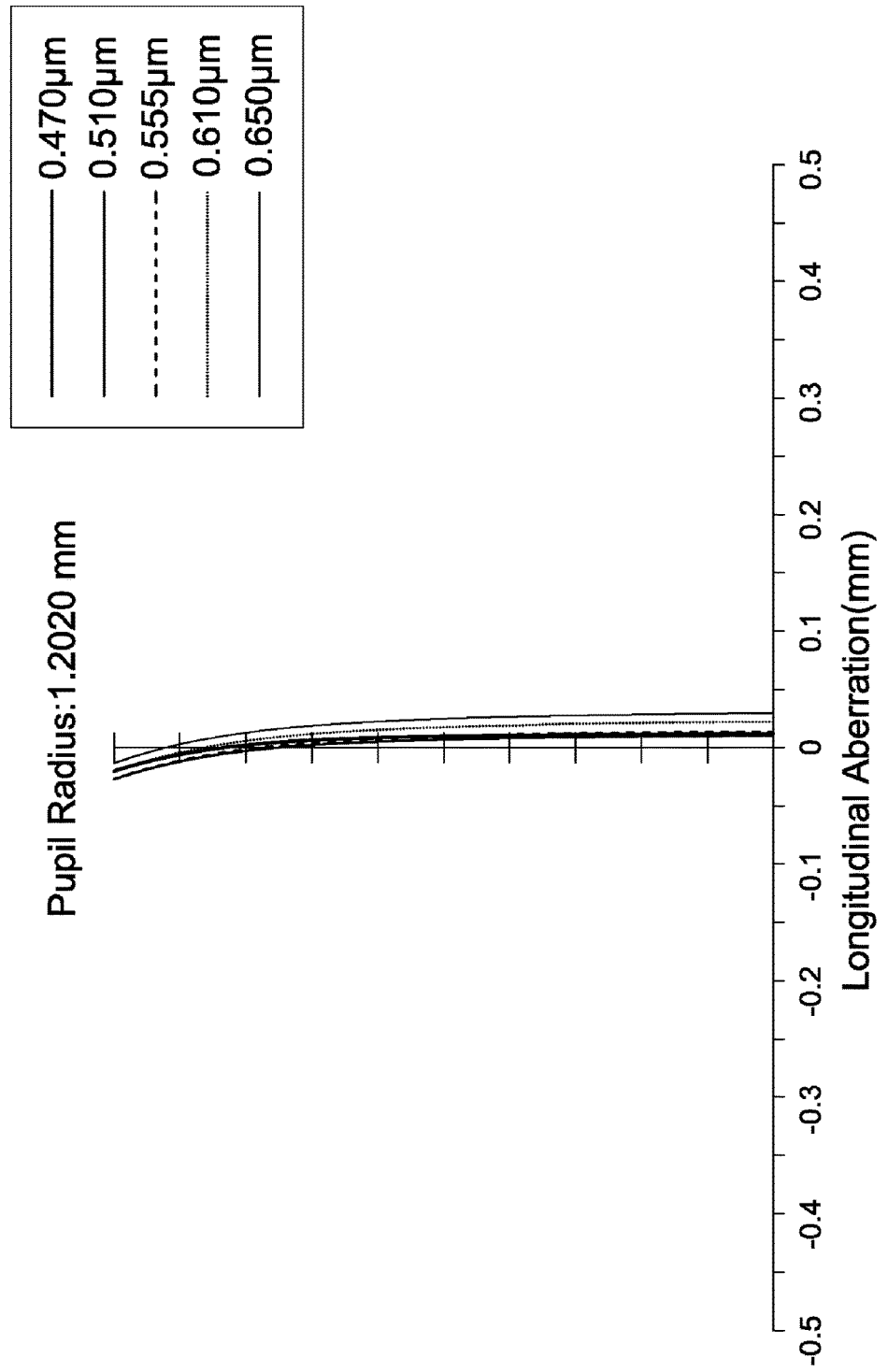

LENS ASSEMBLY

BACKGROUND OF THE INVENTION

Field of the Invention

The invention relates to a lens, and more particularly to a lens assembly.

Description of the Related Art

In recent years, depending on different applications of needs, lens assembly not only has been gradually developed toward miniaturization, but also has been ability of large aperture. However, the conventional lens assembly has been unable to meet demand, and we need another new structure of the lens assembly, and that can meet the miniaturization and large aperture.

BRIEF SUMMARY OF THE INVENTION

The invention provides a lens assembly to solve the above problems. The lens assembly is provided with characteristics of a short total track length and a small F number, and the lens assembly is still capable of obtaining good optical performance.

The lens assembly in accordance with the invention, in sequence from an object side to an image side along an optical axis, comprises a first lens which is a meniscus lens with negative refractive power and includes a convex surface facing the object side; a second lens having negative refractive power and including a concave surface facing the object side; a third lens having positive refractive power and including a convex surface facing the image side; a fourth lens having positive refractive power; a fifth lens having positive refractive power; a sixth lens having negative refractive power, and a seventh lens having refractive power.

In accordance with the invention, the second lens and the third lens are cemented to form a cemented lens; the fifth lens and the sixth lens are cemented to form a cemented lens; the fifth lens includes a convex surface facing the image side; the sixth lens includes a concave surface facing the object side; the seventh lens is aspherical and has positive refractive power and includes a convex surface facing the image side; a stop deposes between the third lens and the fourth lens; the fourth lens includes a convex surface facing the image side; the fifth lens is a biconvex lens; the sixth lens is a biconcave lens; or the seventh lens is a biconvex lens.

In accordance with the invention, the lens assembly satisfies the following condition: $-0.7 \leq 1/Nd_1f_1 + 1/Nd_2f_2 + 1/Nd_3f_3 + 1/Nd_4f_4 + 1/Nd_5f_5 + 1/Nd_6f_6 + 1/Nd_7f_7 \leq 0.7$, wherein $Nd_1$ is a refractive index of the first lens, $f_1$ is an effective focal length of the first lens, $Nd_2$ is a refractive index of the second lens, $f_2$ is an effective focal length of the second lens, $Nd_3$ is a refractive index of the third lens, $f_3$ is an effective focal length of the third lens, $Nd_4$ is a refractive index of the fourth lens, $f_4$ is an effective focal length of the fourth lens, $Nd_5$ is a refractive index of the fifth lens, $f_5$ is an effective focal length of the fifth lens, $Nd_6$ is a refractive index of the sixth lens, $f_6$ is an effective focal length of the sixth lens, $Nd_7$ is a refractive index of the seventh lens, $f_7$ is an effective focal length of the seventh lens.

In accordance with the invention, the lens assembly satisfies the following condition: $0.2 \leq TTL/\theta_m \leq 0.45$, wherein TTL is total track length which is from the object side of the first lens to the image side along an optical axis, and the unit of TTL is mm, $\theta_m$ is a half of maximum field of view (FOV), and the unit of FOV is degree.

In accordance with the invention, the lens assembly satisfies the following condition: $-0.8 \leq ER_{11}/f_1 \leq -0.4$, wherein $ER_{11}$ is an effective radius of the object side of the first lens, $f_1$ is an effective focal length of the first lens.

In accordance with the invention, the lens assembly satisfies the following condition: $30 \leq Vd_2 - Vd_3 \leq 50$, wherein $Vd_2$ is an Abbe number of the second lens, $Vd_3$ is an Abbe number of the third lens.

In accordance with the invention, the lens assembly satisfies the following condition: $25 \leq Vd_5 - Vd_6 \leq 40$, wherein $Vd_5$ is an Abbe number of the fifth lens, $Vd_6$ is an Abbe number of the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is a longitudinal spherical aberration diagram of a lens assembly in accordance with the first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
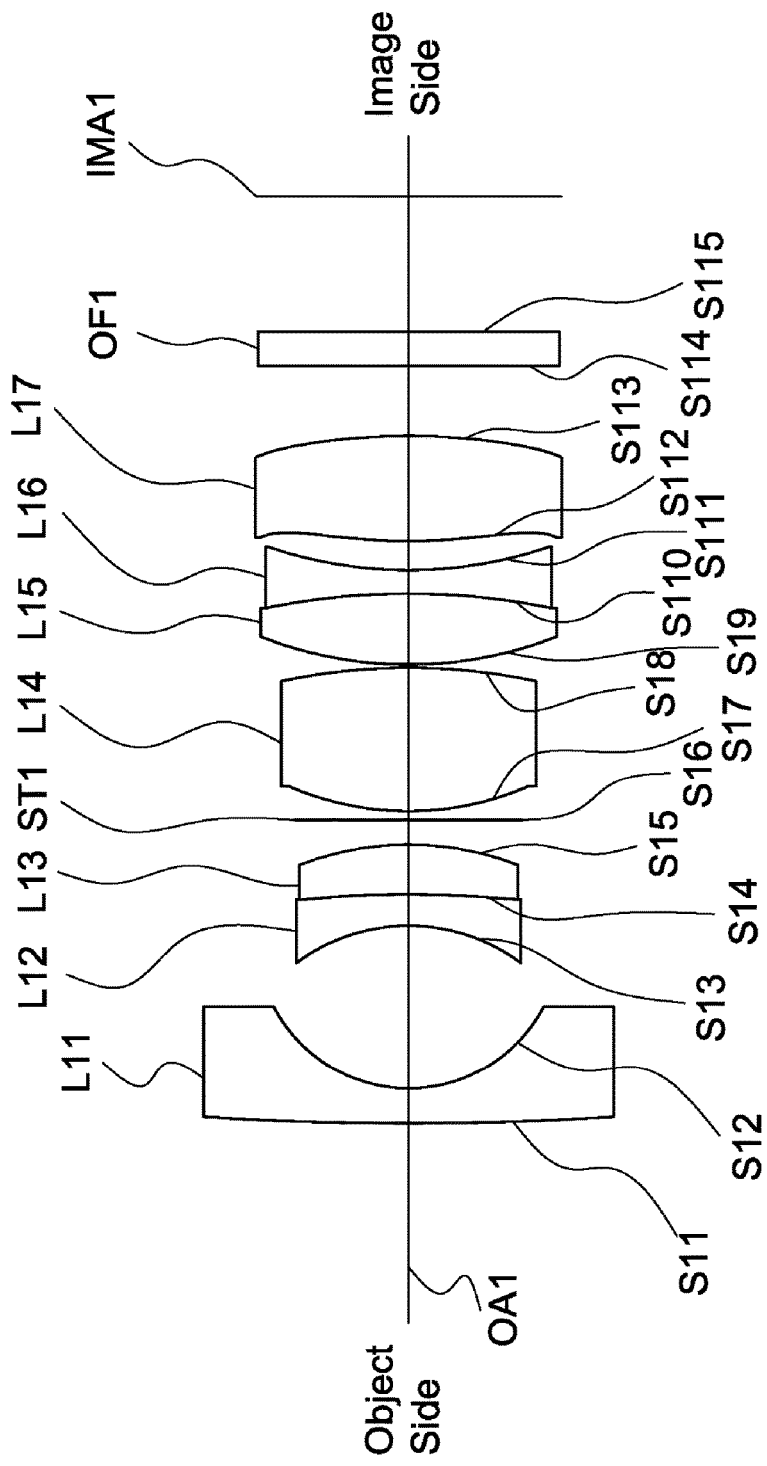
FIG. 1 is a lens layout and optical path diagram of a lens assembly in accordance with a first embodiment of the invention.

Referring to FIG. 1, FIG. 1 is a lens layout and optical path diagram of a lens assembly 1 in accordance with a first embodiment of the invention. The lens assembly 1, in sequence from an object side to an image side IMA1 along an optical axis OA1, comprises a first lens L11 which is a meniscus lens with negative refractive power and includes a convex surface facing the object side S11; a second lens L12 having negative refractive power and including a concave surface facing the object side S13; a third lens L13 having positive refractive power and including a convex surface facing the image side S15; a fourth lens L14 having positive refractive power; a fifth lens L15 having positive refractive power; a sixth lens L16 having negative refractive power, and a seventh lens L17 having refractive power.

In the first embodiment of the lens assembly 1, the first lens L11 is a meniscus lens and the object side S11 of the first lens L11 is a spherical convex surface, and the image side S12 of the first lens L11 is a spherical concave surface. The second lens L12 is a meniscus lens and the object side S13 of the second lens L12 is a spherical concave surface, and the image side S14 of the second lens L12 is a spherical convex surface. The third lens L13 is a meniscus lens and the object side S14 of the third lens L13 is a spherical concave surface, and the image side S15 of the third lens L13 is a spherical convex surface. The image side S14 of the second lens L12 and the object side S14 of the third lens L13 are cemented to form the surface S14. In other words, the second lens L12 and the third lens L13 are cemented to form a cemented lens. The fourth lens L14 is a biconvex lens and the object side S17 of the fourth lens L14 is a spherical convex surface, and the image side S18 of the fourth lens L14 is a spherical convex surface. The fifth lens L15 is a biconvex lens and has an object side surface S19 and an image side surface S110, and both of which are spherical. The sixth lens L16 is a biconcave lens and has an object side surface S110 and an image side surface S111, and both of which are spherical. The image side S110 of the fifth lens L15 and the object side S110 of the sixth lens L16 are cemented to form the surface S110. In other words, the fifth lens L15 and the sixth lens L16 are cemented to form a cemented lens. The seventh lens L17 has positive refractive power. The seventh lens L17 is a biconvex lens and has an object side surface S112 and an image side surface S113, and both of which are aspherical. The optical filter OF1 has an object side surface S114 and an image side surface S115, and both of which are plane.

In addition, the lens assembly 1 of the first embodiment at least satisfies one of the following conditions:

$$-0.7 \leq 1/Nd1_1 f1_1 + 1/Nd1_2 f1_2 + 1/Nd1_3 f1_3 + 1/Nd1_4 f1_4 + 1/Nd1_5 f1_5 + 1/Nd1_6 f1_6 + 1/Nd1_7 f1_7 \leq 0.7 \quad (1)$$

$$0.2 \leq TTL1/\theta1_m \leq 0.45 \quad (2)$$

$$-0.8 \leq ER1_{11}/f1_1 - 0.4 \quad (3)$$

$$30 \leq Vd1_2 - Vd1_3 \leq 50 \quad (4)$$

$$25 \leq Vd1_5 - Vd1_6 \leq 40 \quad (5)$$

Wherein $Nd1_1$ is a refractive index of the first lens L11, $f1_1$ is an effective focal length of the first lens L11, $Nd1_2$ is a refractive index of the second lens L12, $f1_2$ is an effective focal length of the second lens L12, $Nd1_3$ is a refractive index of the third lens L13, $f1_3$ is an effective focal length of the third lens L13, $Nd1_4$ is a refractive index of the fourth lens L14, $f1_4$ is an effective focal length of the fourth lens L14, $Nd1_5$ is a refractive index of the fifth lens L15, $f1_5$ is an effective focal length of the fifth lens L15, $Nd1_6$ is a refractive index of the sixth lens L16, $f1_6$ is an effective focal length of the sixth lens L16, $Nd1_7$ is a refractive index of the seventh lens L17, $f1_7$ is an effective focal length of the seventh lens L17, TTL1 is total track length which is from the object side S11 of the first lens L11 to the image side IMA1 along an optical axis OA1, and the unit of TTL1 is mm, $\theta1_m$ is a half of maximum field of view (FOV), and the unit of FOV is degree, $ER1_{11}$ is an effective radius of the object side S11 of the first lens L11, $f1_1$ is an effective focal length of the first lens L11, $Vd1_2$ is an Abbe number of the second lens L12, $Vd1_3$ is an Abbe number of the third lens L13, $Vd1_5$ is an Abbe number of the fifth lens L15, $Vd1_6$ is an Abbe number of the sixth lens L16.

Due to the above design of the lenses and stop ST1, the lens assembly 1 is provided with characteristics of a short total track length, a small F number and an aberration that can be corrected effectively.

Referring to TABLE 1, the optical specifications of the lens assembly 1 of the first embodiment. TABLE 1 shows that the effective focal length (f1), F-number and total track length (TTL1) is equal to 3.78 mm, 1.63 and 18.93 mm.

TABLE 1

Effective Focal Length (f1) = 3.78 mm F-number = 1.63 TTL1 = 18.93 mm

| Surface | Radius of Curvature (mm) | Thickness (mm) | Nd | Vd | Remark |
|---|---|---|---|---|---|
| S11 | 70.187 | 0.725 | 1.52 | 65 | The first lens L11 |
| S12 | 3.124 | 3.308 | | | |
| S13 | −3.856 | 0.638 | 1.51 | 63 | The second lens L12 |
| S14 | −23.167 | 1.011 | 1.88 | 30 | The third lens L13 |
| S15 | −6.26 | 0.508 | | | |
| S16 | ∞ | 0.177 | | | Stop ST1 |
| S17 | 6.14 | 2.935 | 1.52 | 83 | The fourth lens L14 |
| S18 | −12.657 | 0.07 | | | |
| S19 | 8.405 | 1.439 | 1.76 | 51 | The fifth lens L15 |
| S110 | −14.805 | 0.477 | 1.91 | −20 | The sixth lens L16 |
| S111 | 8.896 | 0.595 | | | |
| S112 | 11.161 | 2.157 | 1.65 | 53 | The seventh lens L17 |
| S113 | −12.707 | 1.427 | | | |
| S114 | ∞ | 0.7 | 1.52 | 64 | Optical filter OF1 |
| S115 | ∞ | 2.756 | | | |

The aspheric surface sag z of each lens in TABLE 1 can be calculated by the following formula:

$$z = ch^2/\{1 + [1-(k+1)c^2h^2]^{1/2}\} + Ah^4 + Bh^6 + Ch^8 + Dh^{10}$$

wherein c is curvature, h is the vertical distance from the lens surface to the optical axis, k is conic constant and A, B, C and D are aspheric coefficients.

In the lens assembly 1 of the first embodiment, the conic constant k and the aspheric coefficients A, B, C and D of each surface are shown in TABLE 2.

TABLE 2

| Surface | k | A | B | C | D |
|---|---|---|---|---|---|
| S112 | 0 | −1.508E−03 | −2.232E−04 | 1.577E−05 | −2.385E−06 |
| S113 | −53.573 | −1.904E−03 | 1.305E−04 | −1.331E−05 | 6.389E−09 |

For the lens assembly 1 of the first embodiment, the $Nd1_1$ is 1.52, the $f1_1$ is −6.29 mm, the $Nd1_2$ is 1.51, the $f1_2$ is −9.148 mm, the $Nd1_3$ is 1.88, the $f1_3$ is 9.425 mm, the $Nd1_4$ is 1.52, the $f1_4$ is 8.382 mm, the $Nd1_5$ is 1.76, the $f1_5$ is 7.223 mm, the $Nd1_6$ is 1.91, the $f1_6$ is −5.995 mm, the $Nd1_7$ is 1.65, the $f1_7$ is 9.447 mm, the total track length (TTL1) which is from the object side of the first lens L11 to the image side IMA1 along an optical axis OA1 is 18.93 mm, the $\theta1_m$ is a half of maximum field of view (FOV), the $\theta1_m$ is 50.1°, the $ER1_{11}$ is an effective radius of the object side S11 of the first lens L11, the $ER1_{11}$ is 4.185 mm, the $Vd1_2$ is 63, the $Vd1_3$ is 30, the $Vd1_5$ is 51, the $Vd1_6$ is 20. According to the above data, the following values can be obtained: $1/Nd1_1 f1_1 + 1/Nd1_2 f1_2 + 1/Nd1_3 f1_3 + 1/Nd1_4 f1_4 + 1/Nd1_5 f1_5 + 1/Nd1_6 f1_6 + 1/$ $Nd1_7f1_7=0.0135$, $TTL1/\theta1_m=0.38$, $ER1_{11}/f1_1=-0.67$, $Vd1_2-Vd1_3=33$ and $Vd1_5-Vd1_6=31$, which satisfy the above condition (1)-(5).

Figure 2B:
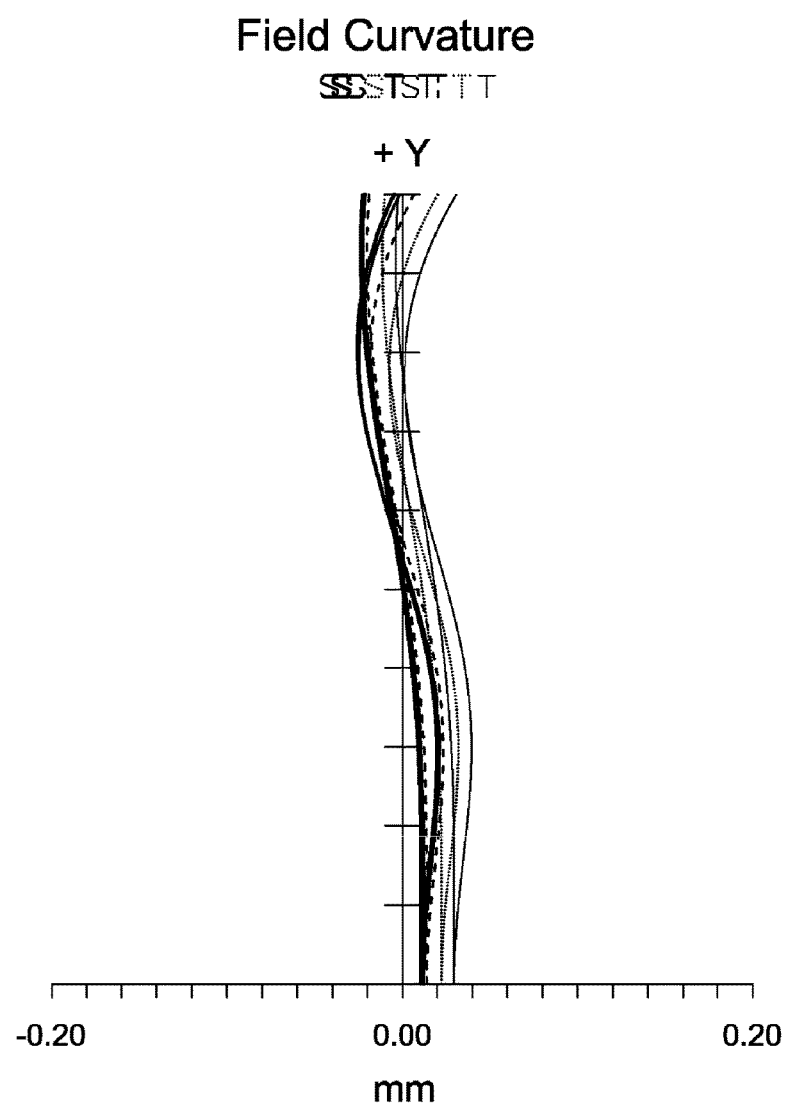
FIG. 2B is a astigmatic field curves diagram of a lens assembly in accordance with the first embodiment of the invention.
Figure 2C:
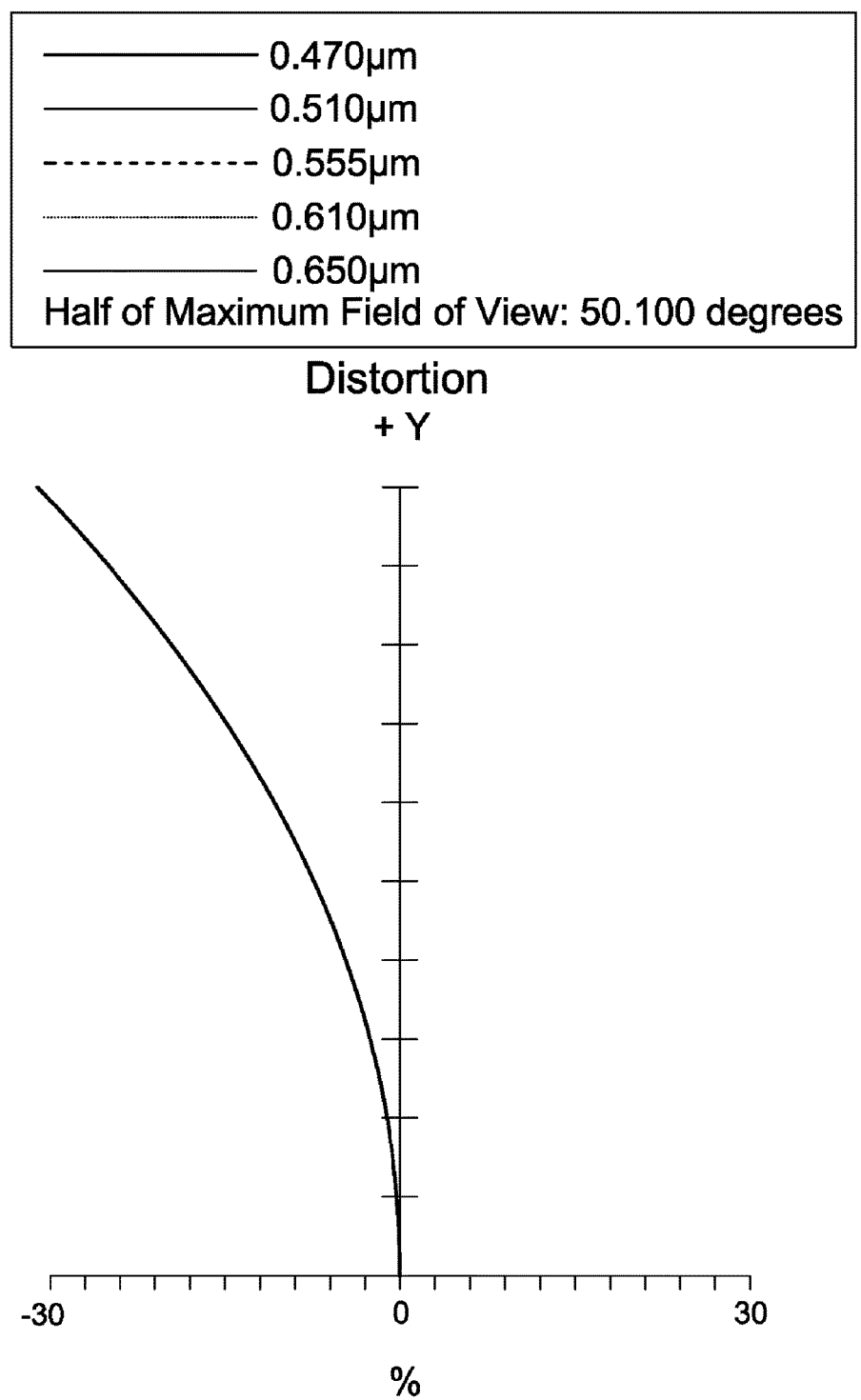
FIG. 2C is a distortion diagram of a lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows the longitudinal aberration diagram of the lens assembly 1 of the first embodiment, FIG. 2B shows the field curvature diagram of the lens assembly 1 of the first embodiment, FIG. 2C shows the distortion diagram of the lens assembly 1 of the first embodiment.

FIG. 2A shows that the longitudinal aberration in the lens assembly 1 of the first embodiment ranges between −0.05 mm and 0.05 mm for the wavelengths of 0.470 μm, 0.510 μm, 0.555 μm, 0.610 μm and 0.650 μm. FIG. 2B shows that the field curvature of tangential direction and sagittal direction in the lens assembly 1 of the first embodiment ranges between −0.04 mm and 0.04 mm for the wavelengths of 0.470 μm, 0.510 μm, 0.555 μm, 0.610 μm and 0.650 μm. FIG. 2C shows (the five lines in the figure almost coincide to appear as if one line) that the distortion in the lens assembly 1 of the first embodiment ranges between −33% and 0% for the wavelengths of 0.470 μm, 0.510 μm, 0.555 μm, 0.610 μm and 0.650 μm. It is obvious that the longitudinal aberration, the field curvature, the distortion and the lateral color of the lens assembly 1 of the first embodiment can be corrected effectively, thereby capable of obtaining good optical performance.

Figure 3:
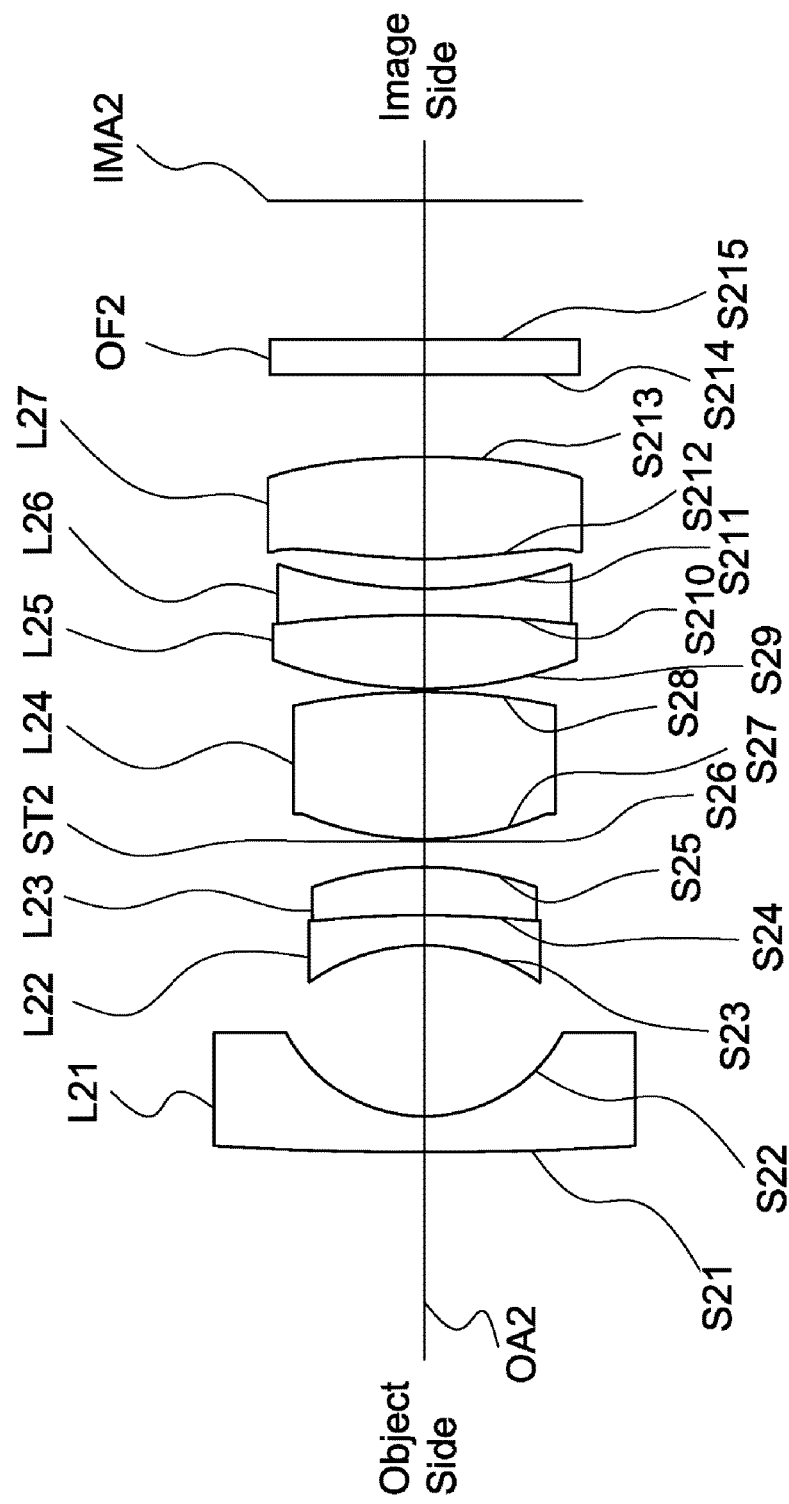
FIG. 3 is a lens layout and optical path diagram of a lens assembly in accordance with a second embodiment of the invention.

Referring to FIG. 3, FIG. 3 is a lens layout and optical path diagram of a lens assembly 2 in accordance with a second embodiment of the invention The lens assembly 2, in sequence from an object side to an image side IMA2 along an optical axis OA2, comprises a first lens L21 which is a meniscus lens with negative refractive power and includes a convex surface facing the object side S21; a second lens L22 having negative refractive power and including a concave surface facing the object side S23; a third lens L23 having positive refractive power and including a convex surface facing the image side S25; a fourth lens L24 having positive refractive power; a fifth lens L25 having positive refractive power; a sixth lens L26 having negative refractive power, and a seventh lens L27 having refractive power.

In the second embodiment of the lens assembly 2, the first lens L21 is a meniscus lens and the object side S21 of the first lens L21 is a spherical convex surface, and the image side S22 of the first lens L21 is a spherical concave surface. The second lens L22 is a meniscus lens and the object side S23 of the second lens L22 is a spherical concave surface, and the image side S24 of the second lens L22 is a spherical convex surface. The third lens L23 is a meniscus lens and the object side S24 of the third lens L23 is a spherical concave surface, and the image side S25 of the third lens L23 is a spherical convex surface. The image side S24 of the second lens L22 and the object side S24 of the third lens L23 are cemented to form the surface S24. In other words, the second lens L22 and the third lens L23 are cemented to form a cemented lens. The fourth lens L24 is a biconvex lens and the object side S27 of the fourth lens L24 is a spherical convex surface, and the image side S28 of the fourth lens L24 is a spherical convex surface. The fifth lens L25 is a biconvex lens and has an object side surface S29 and an image side surface S210, and both of which are spherical. The sixth lens L26 is a biconcave lens and has an object side surface S210 and an image side surface S211, and both of which are spherical. The image side S210 of the fifth lens L25 and the object side S210 of the sixth lens L26 are cemented to form the surface S210. In other words, the fifth lens L25 and the sixth lens L26 are cemented to form a cemented lens. The seventh lens L27 has positive refractive power. The seventh lens L27 is a biconvex lens and has an object side surface S212 and an image side surface S213, and both of which are aspherical. The optical filter OF2 has an object side surface S214 and an image side surface S215, and both of which are plane.

In addition, the lens assembly 2 of the second embodiment at least satisfies one of the following conditions:

$$-0.7 \leq 1/Nd2_1f2_1+1/Nd2_2f2_2+1/Nd2_3f2_3+1/Nd2_4f2_4+1/Nd2_5f2_5+1/Nd2_6f2_6+1/Nd2_7f2_7 \leq 0.7 \quad (6)$$

$$0.2 \leq TTL2/\theta2_m \leq 0.45 \quad (7)$$

$$-0.8 \leq ER2_{11}/f2_1 \leq -0.4 \quad (8)$$

$$30 \leq Vd2_2-Vd2_3 \leq 50 \quad (9)$$

$$25 \leq Vd2_5-Vd2_6 \leq 40 \quad (10)$$

Wherein $Nd2_1$ is a refractive index of the first lens L21, $f2_1$ is an effective focal length of the first lens L21, $Nd2_2$ is a refractive index of the second lens L22, $f2_2$ is an effective focal length of the second lens L22, $Nd2_3$ is a refractive index of the third lens L23, $f2_3$ is an effective focal length of the third lens L23, $Nd2_4$ is a refractive index of the fourth lens L24, $f2_4$ is an effective focal length of the fourth lens L24, $Nd2_5$ is a refractive index of the fifth lens L25, $f2_5$ is an effective focal length of the fifth lens L25, $Nd2_6$ is a refractive index of the sixth lens L26, $f2_6$ is an effective focal length of the sixth lens L26, $Nd2_7$ is a refractive index of the seventh lens L27, $f2_7$ is an effective focal length of the seventh lens L27, TTL2 is total track length which is from the object side S21 of the first lens L21 to the image side IMA2 along an optical axis OA2, and the unit of TTL2 is mm, $\theta2_m$ is a half of maximum field of view (FOV), and the unit of FOV is degree, $ER2_{11}$ is an effective radius of the object side S21 of the first lens L21, $f2_1$ is an effective focal length of the first lens L21, $Vd2_2$ is an Abbe number of the second lens L22, $Vd2_3$ is an Abbe number of the third lens L23, $Vd2_5$ is an Abbe number of the fifth lens L25, $Vd2_6$ is an Abbe number of the sixth lens L26.

Due to the above design of the lenses and stop ST2, the lens assembly 2 is provided with characteristics of a short total track length, a small F number and an aberration that can be corrected effectively.

Referring to TABLE 3, the optical specifications of the lens assembly 2 of the second embodiment. TABLE 3 shows that the effective focal length (f2), F-number and total track length (TTL2) is equal to 3.78 mm, 1.62 and 18.97 mm.

TABLE 3

Effective Focal Length (f2) = 3.78 mm F-number = 1.62 TTL2 = 18.97 mm

| Surface | Radius of Curvature (mm) | Thickness (mm) | Nd | Vd | Remark |
|---------|--------------------------|----------------|------|------|---------------------|
| S21     | 66.819                   | 0.719          | 1.52 | 65   | The first lens L21  |
| S22     | 3.125                    | 3.41           |      |      |                     |
| S23     | −3.94                    | 0.6            | 1.51 | 64.2 | The second lens L22 |
| S24     | −21.994                  | 0.959          | 1.89 | −30  | The third lens L23  |
| S25     | −6.362                   | 0.508          |      |      |                     |
| S26     | ∞                        | 0.06           |      |      | Stop ST2            |
| S27     | 6.292                    | 2.936          | 1.49 | 81   | The fourth lens L24 |
| S28     | −12.193                  | 0.07           |      |      |                     |
| S29     | 8.436                    | 1.452          | 1.78 | 50   | The fifth lens L25  |
| S210    | −23.667                  | 0.521          | 1.93 | 18   | The sixth lens L26  |
| S211    | 8.913                    | 0.595          |      |      |                     |
| S212    | 11.207                   | 2.046          | 1.68 | 55   | The seventh lens L27|

TABLE 3-continued

Effective Focal Length (f2) = 3.78 mm F-number = 1.62 TTL2 = 18.97 mm

| Surface | Radius of Curvature (mm) | Thickness (mm) | Nd | Vd | Remark |
|---|---|---|---|---|---|
| S213 | −12.41 | 1.634 | | | |
| S214 | ∞ | 0.7 | 1.52 | 64 | Optical filter OF2 |
| S215 | ∞ | 2.756 | | | |

The aspheric surface sag z of each lens in TABLE 3 can be calculated by the following formula:

$$z = ch^2/\{1+[1-(k+1)c^2h^2]^{1/2}\} + Ah^4 + Bh^6 + Ch^8 + Dh^{10}$$

wherein c is curvature, h is the vertical distance from the lens surface to the optical axis, k is conic constant and A, B, C and D are aspheric coefficients.

In the lens assembly 2 of the second embodiment, the conic constant k and the aspheric coefficients A, B, C and D of each surface are shown in TABLE 4.

TABLE 4

| Surface | k | A | B | C | D |
|---|---|---|---|---|---|
| S212 | 0 | −1.286E−03 | −1.973E−04 | 1.767E−05 | −2.219E−06 |
| S213 | −47.265 | −1.9E−03 | 1.403E−04 | −1.239E−05 | −4.99E−08 |

For the lens assembly 2 of the second embodiment, the $Nd2_1$ is 1.52, the $f2_1$ is −6.31 mm, the $Nd2_2$ is 1.51, the $f2_2$ is −9.492 mm, the $Nd2_3$ is 1.89, the $f2_3$ is 9.716 mm, the $Nd2_4$ is 1.49, the $f2_4$ is 8.918 mm, the $Nd2_5$ is 1.78, the $f2_5$ is 8.106 mm, the $Nd2_6$ is 1.93, the $f2_6$ is −6.841 mm, the $Nd2_7$ is 1.68, the $f2_7$ is 8.946 mm, the total track length (TTL2) which is from the object side of the first lens L21 to the image side IMA2 along an optical axis OA2 is 18.97 mm, the $\theta2_m$ is a half of maximum field of view (FOV), the $\theta2_m$ is 50.1°, the $ER2_{11}$ is an effective radius of the object side S21 of the first lens L21, the $ER2_{11}$ is 4.186 mm, the $Vd2_2$ is 64.2, the $Vd2_3$ is 30, the $Vd2_5$ is 50, the $Vd2_6$ is 18. According to the above data, the following values can be obtained: $1/Nd2_1f2_1 + 1/Nd2_2f2_2 + 1/Nd2_3f2_3 + 1/Nd2_4f2_4 + 1/Nd2_5f2_5 + 1/Nd2_6f2_6 + 1/Nd2_7f2_7 = 0.0159$, $TTL2/\theta2_m = 0.38$, $ER2_{11}/f2_1 = −0.66$, $Vd2_2 − Vd2_3 = 34.2$ and $Vd2_5 − Vd2_6 = 32$, which satisfy the above condition (6)-(10).

Figure 4A:
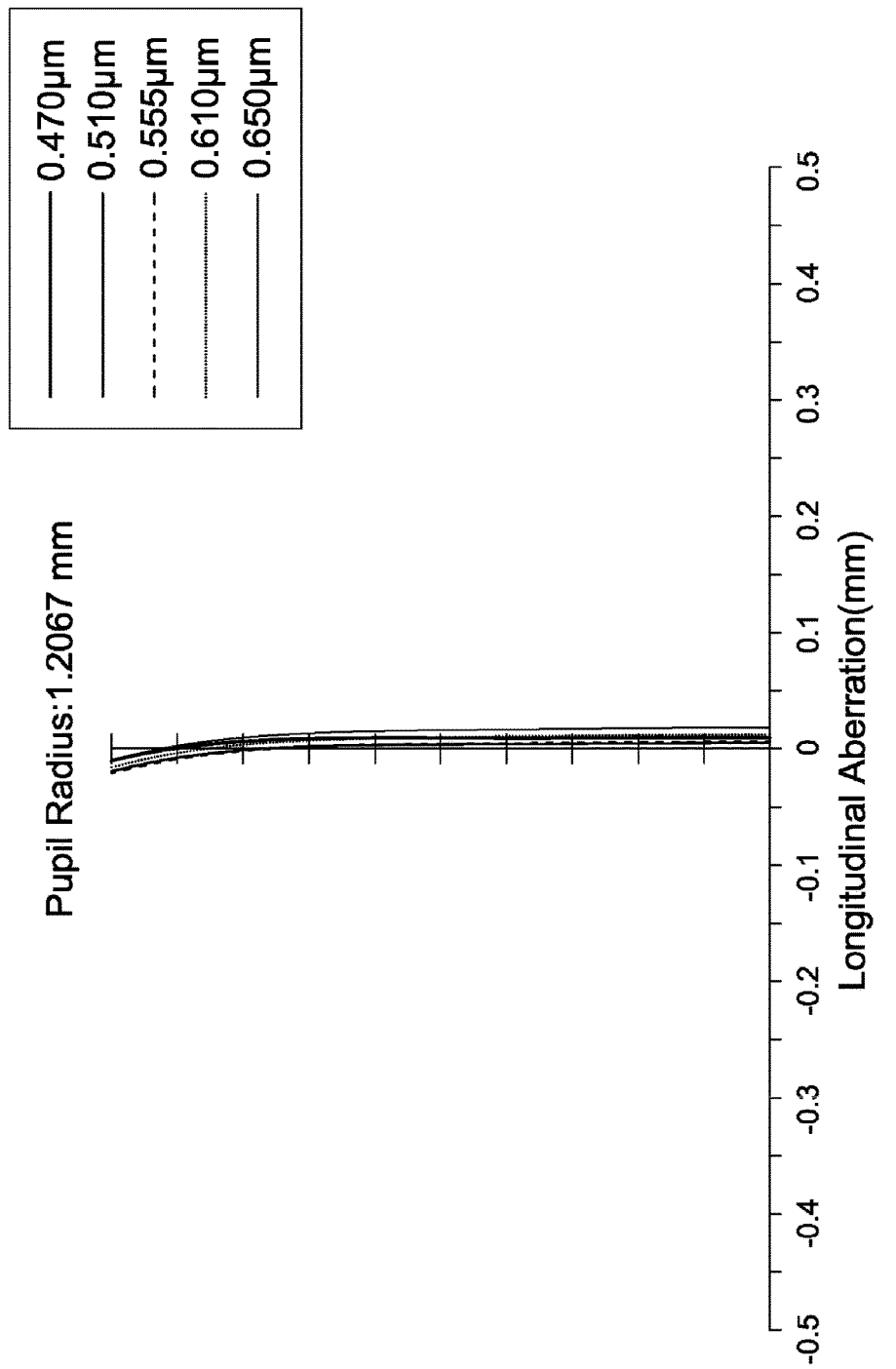
FIG. 4A is a longitudinal spherical aberration diagram of a lens assembly in accordance with the second embodiment of the invention.
Figure 4B:
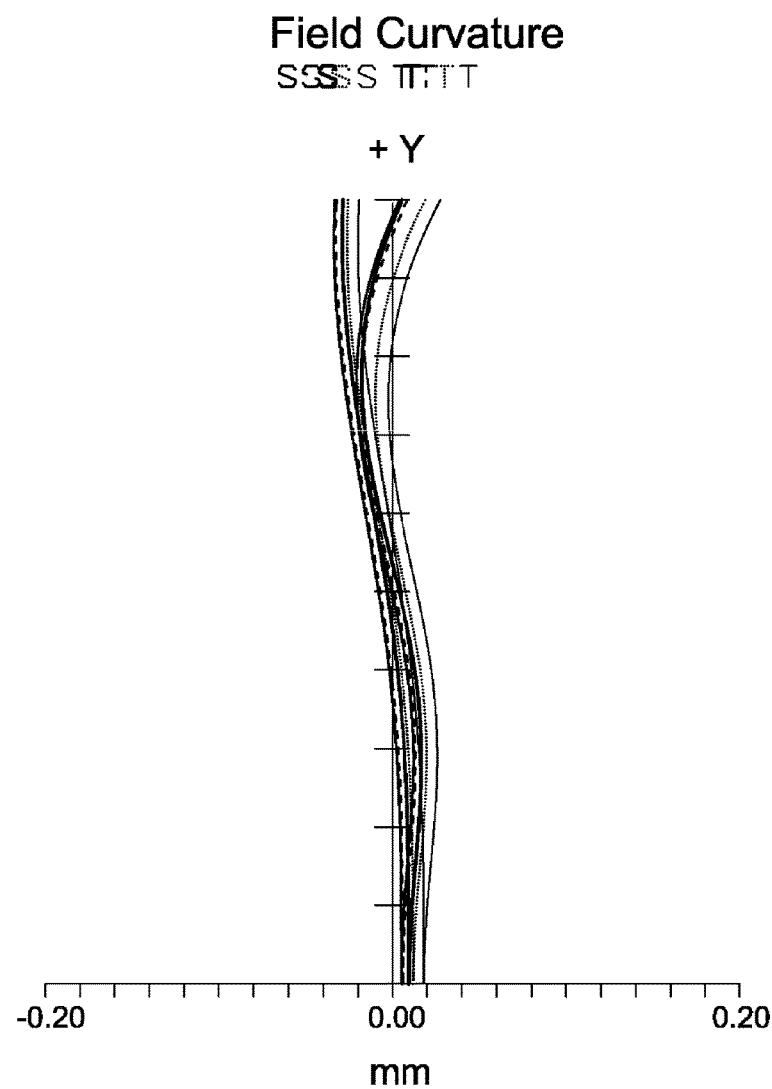
FIG. 4B is a astigmatic field curves diagram of a lens assembly in accordance with the second embodiment of the invention.
Figure 4C:
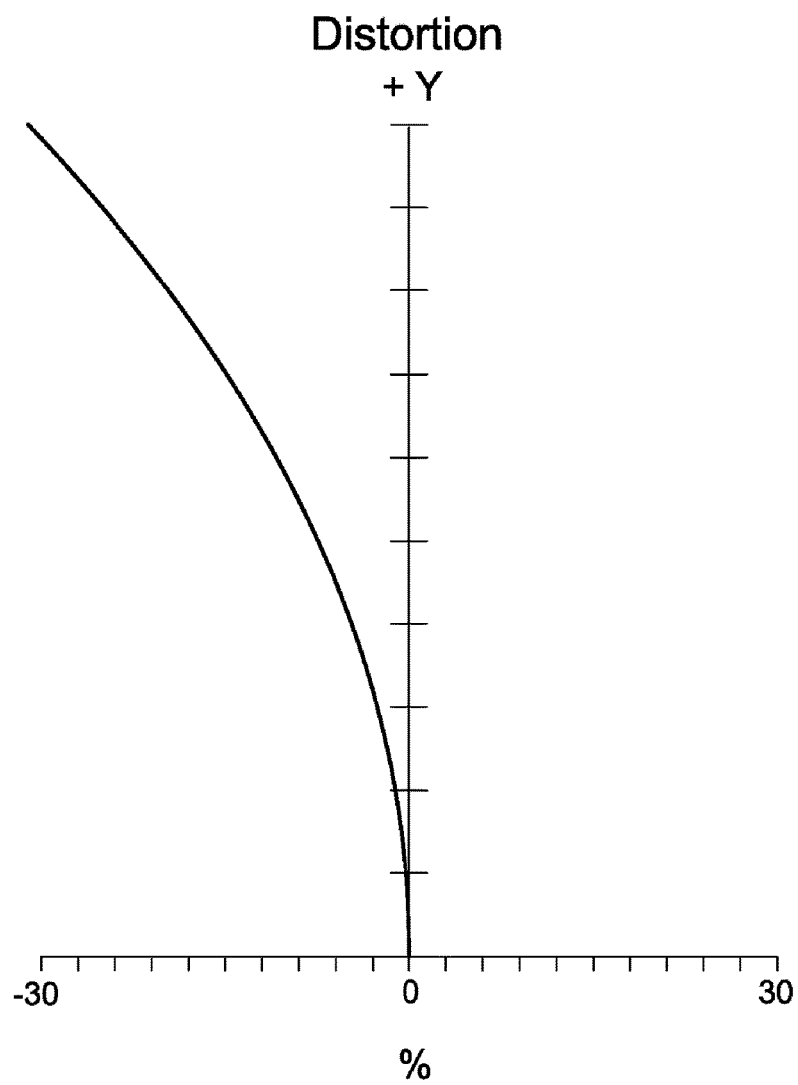
FIG. 4C is a distortion diagram of a lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows the longitudinal aberration diagram of the lens assembly 2 of the second embodiment, FIG. 4B shows the field curvature diagram of the lens assembly 2 of the second embodiment, FIG. 4C shows the distortion diagram of the lens assembly 2 of the second embodiment.

FIG. 4A shows that the longitudinal aberration in the lens assembly 2 of the second embodiment ranges between −0.05 mm and 0.05 mm for the wavelengths of 0.470 μm, 0.510 μm, 0.555 μm, 0.610 μm and 0.650 μm. FIG. 4B shows that the field curvature of tangential direction and sagittal direction in the lens assembly 2 of the second embodiment ranges between −0.04 mm and 0.04 mm for the wavelengths of 0.470 μm, 0.510 μm, 0.555 μm, 0.610 μm and 0.650 μm. FIG. 4C shows (the five lines in the figure almost coincide to appear as if one line) that the distortion in the lens assembly 2 of the second embodiment ranges between −33% and 0% for the wavelengths of 0.470 μm, 0.510 μm, 0.555 μm, 0.610 μm and 0.650 μm. It is obvious that the longitudinal aberration, the field curvature, the distortion and the lateral color of the lens assembly 2 of the second embodiment can be corrected effectively, thereby capable of obtaining good optical performance.

Figure 5:
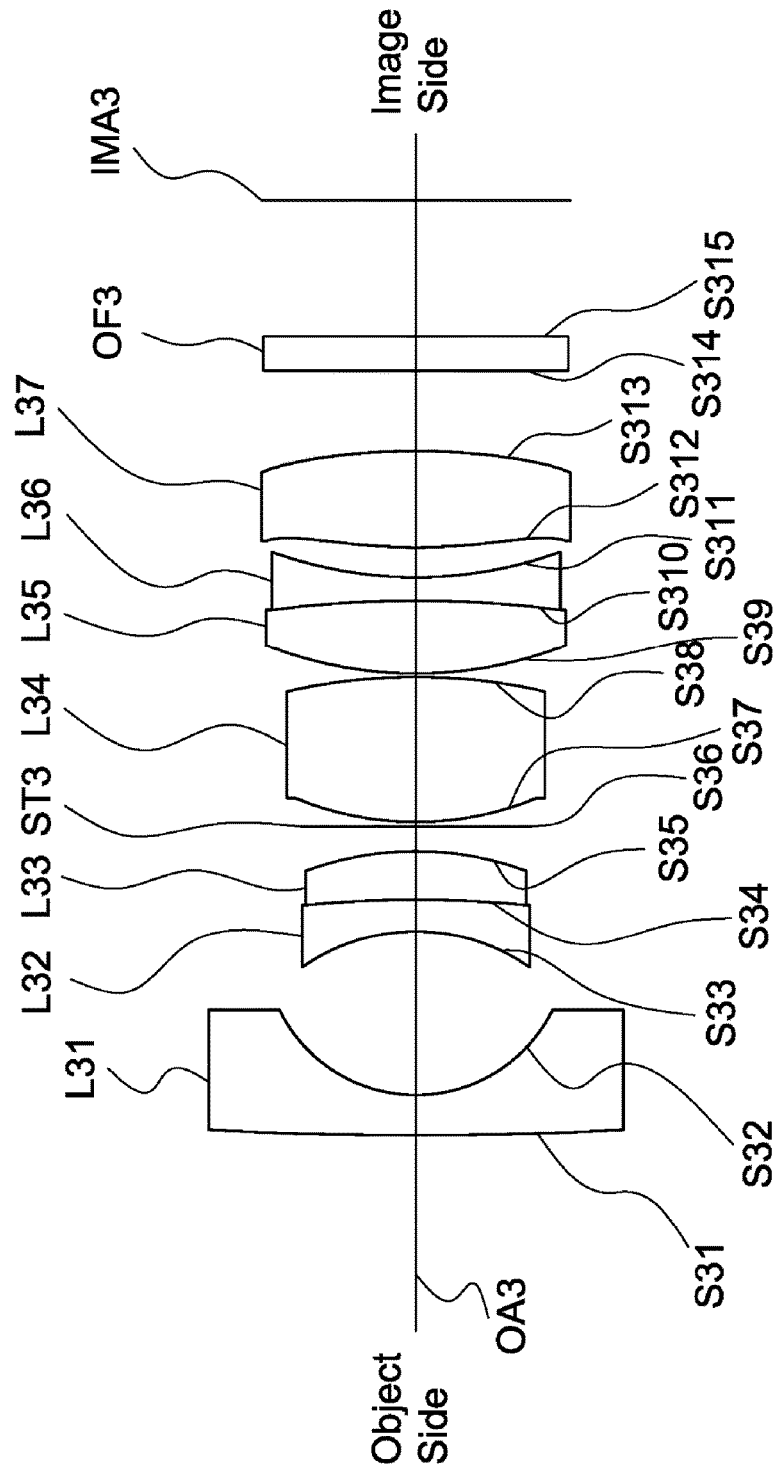
FIG. 5 is a lens layout and optical path diagram of a lens assembly in accordance with a third embodiment of the invention.

Referring to FIG. 5, FIG. 5 is a lens layout and optical path diagram of a lens assembly 3 in accordance with a third embodiment of the invention The lens assembly 3, in sequence from an object side to an image side IMA3 along an optical axis OA3, comprises a first lens L31 which is a meniscus lens with negative refractive power and includes a convex surface facing the object side S31; a second lens L32 having negative refractive power and including a concave surface facing the object side S33; a third lens L33 having positive refractive power and including a convex surface facing the image side S35; a fourth lens L34 having positive refractive power; a fifth lens L35 having positive refractive power; a sixth lens L36 having negative refractive power, and a seventh lens L37 having refractive power.

In the third embodiment of the lens assembly 3, the first lens L31 is a meniscus lens and the object side S31 of the first lens L31 is a spherical convex surface, and the image side S32 of the first lens L31 is a spherical concave surface. The second lens L32 is a meniscus lens and the object side S33 of the second lens L32 is a spherical concave surface, and the image side S34 of the second lens L32 is a spherical convex surface. The third lens L33 is a meniscus lens and the object side S34 of the third lens L33 is a spherical concave surface, and the image side S35 of the third lens L33 is a spherical convex surface. The image side S34 of the second lens L32 and the object side S34 of the third lens L33 are cemented to form the surface S34. In other words, the second lens L32 and the third lens L33 are cemented to form a cemented lens. The fourth lens L34 is a biconvex lens and the object side S37 of the fourth lens L34 is a spherical convex surface, and the image side S38 of the fourth lens L34 is a spherical convex surface. The fifth lens L35 is a biconvex lens and has an object side surface S39 and an image side surface S310, and both of which are spherical. The sixth lens L36 is a biconcave lens and has an object side surface S310 and an image side surface S311, and both of which are spherical. The image side S310 of the fifth lens L35 and the object side S310 of the sixth lens L36 are cemented to form the surface S310. In other words, the fifth lens L35 and the sixth lens L36 are cemented to form a cemented lens. The seventh lens L37 has positive refractive power. The seventh lens L37 is a biconvex lens and has an object side surface S312 and an image side surface S313, and both of which are aspherical. The optical filter OF3 has an object side surface S314 and an image side surface S315, and both of which are plane.

In addition, the lens assembly 3 of the third embodiment at least satisfies one of the following conditions:

$$-0.7 \leq 1/Nd3_1 f3_1 + 1/Nd3_2 f3_2 + 1/Nd3_3 f3_3 + 1/Nd3_4 f3_4 + 1/Nd3_5 f3_5 + 1/Nd3_6 f3_6 + 1/Nd3_7 f3_7 \leq 0.7 \quad (11)$$

$$0.2 \leq TTL3/\theta3_m \leq 0.45 \quad (12)$$

$$-0.8 \leq ER3_{11}/f3_1 \leq -0.4 \quad (13)$$

$$30 \leq Vd3_2 - Vd3_3 \leq 50 \quad (14)$$

$$25 \leq Vd3_5 - Vd3_6 \leq 40 \quad (15)$$

Wherein $Nd3_1$ is a refractive index of the first lens L31, $f3_1$ is an effective focal length of the first lens L31, $Nd3_2$ is a refractive index of the second lens L32, $f3_2$ is an effective focal length of the second lens L32, $Nd3_3$ is a refractive index of the third lens L33, f3$_3$ is an effective focal length of the third lens L33, Nd3$_4$ is a refractive index of the fourth lens L34, f3$_4$ is an effective focal length of the fourth lens L34, Nd3$_5$ is a refractive index of the fifth lens L35, f3$_5$ is an effective focal length of the fifth lens L35, Nd3$_6$ is a refractive index of the sixth lens L36, f3$_6$ is an effective focal length of the sixth lens L36, Nd3$_7$ is a refractive index of the seventh lens L37, f3$_7$ is an effective focal length of the seventh lens L37, TTL3 is total track length which is from the object side S31 of the first lens L31 to the image side IMA3 along an optical axis OA3, and the unit of TTL3 is mm, θ3$_m$ is a half of maximum field of view (FOV), and the unit of FOV is degree, ER3$_{11}$ is an effective radius of the object side S31 of the first lens L31, f3$_1$ is an effective focal length of the first lens L31, Vd3$_2$ is an Abbe number of the second lens L32, Vd3$_3$ is an Abbe number of the third lens L33, Vd3$_5$ is an Abbe number of the fifth lens L35, Vd3$_6$ is an Abbe number of the sixth lens L36.

Due to the above design of the lenses and stop ST3, the lens assembly 3 is provided with characteristics of a short total track length, a small F number and an aberration that can be corrected effectively.

Referring to TABLE 5, the optical specifications of the lens assembly 3 of the third embodiment. TABLE 5 shows that the effective focal length (f3), F-number and total track length (TTL3) is equal to 3.78 mm, 1.62 and 18.96 mm.

TABLE 5

Effective Focal Length (f3) = 3.78 mm
F-number = 1.62  TTL3 = 18.96 mm

| Surface | Radius of Curvature (mm) | Thickness (mm) | Nd | Vd | Remark |
|---|---|---|---|---|---|
| S31 | 82.08 | 0.812 | 1.5 | 65 | The first lens L31 |
| S32 | 3.069 | 3.326 | | | |
| S33 | −3.952 | 0.637 | 1.52 | 64 | The second lens L32 |
| S34 | −23.753 | 0.981 | 1.9 | 32 | The third lens L33 |
| S35 | −6.466 | 0.508 | | | |
| S36 | ∞ | 0.088 | | | Stop ST3 |
| S37 | 6.38 | 2.935 | 1.5 | 82 | The fourth lens L34 |
| S38 | −11.836 | 0.07 | | | |
| S39 | 8.2 | 1.489 | 1.78 | 50 | The fifth lens L35 |
| S310 | −22.29 | 0.481 | 1.95 | 19 | The sixth lens L36 |
| S311 | 8.632 | 0.595 | | | |
| S312 | 11.019 | 1.954 | 1.68 | 55 | The seventh lens L37 |
| S313 | −12.478 | 1.627 | | | |
| S314 | ∞ | 0.7 | 1.52 | 64 | Optical filter OF3 |
| S315 | ∞ | 2.756 | | | |

The aspheric surface sag z of each lens in TABLE 5 can be calculated by the following formula:

$$z = ch^2/\{1+[1-(k+1)c^2h^2]^{1/2}\} + Ah^4 + Bh^6 + Ch^8 + Dh^{10}$$

wherein c is curvature, h is the vertical distance from the lens surface to the optical axis, k is conic constant and A, B, C and D are aspheric coefficients.

In the lens assembly 3 of the third embodiment, the conic constant k and the aspheric coefficients A, B, C and D of each surface are shown in TABLE 6.

TABLE 6

| Surface | k | A | B | C | D |
|---|---|---|---|---|---|
| S312 | 0 | −1.328E−03 | −2.003E−04 | 1.734E−05 | −2.284E−06 |
| S313 | −50.166 | −1.929E−03 | 1.342E−04 | −1.282E−05 | −4.274E−08 |

For the lens assembly 3 of the third embodiment, the Nd3$_1$ is 1.5, the f3$_1$ is −6.38 mm, the Nd3$_2$ is 1.52, the f3$_2$ is −9.193 mm, the Nd3$_3$ is 1.9, the f3$_3$ is 9.558 mm, the Nd3$_4$ is 1.5, the f3$_4$ is 8.745 mm, the Nd3$_5$ is 1.78, the f3$_5$ is 7.826 mm, the Nd3$_6$ is 1.95, the f3$_6$ is −6.441 mm, the Nd3$_7$ is 1.68, the f3$_7$ is 8.877 mm, the total track length (TTL3) which is from the object side of the first lens L31 to the image side IMA3 along an optical axis OA3 is 18.96 mm, the θ3$_m$ is a half of maximum field of view (FOV), the θ3$_m$ is 50.1°, the ER3$_{11}$ is an effective radius of the object side S31 of the first lens L31, the ER3$_{11}$ is 4.187 mm, the Vd3$_2$ is 64, the Vd3$_3$ is 32, the Vd3$_5$ is 50, the Vd3$_6$ is 19. According to the above data, the following values can be obtained: 1/Nd3$_1$f3$_1$+1/Nd3$_2$f3$_2$+1/Nd3$_3$f3$_3$+1/Nd3$_4$f3$_4$+1/Nd3$_5$f3$_5$+1/Nd3$_6$f3$_6$+1/Nd3$_7$f3$_7$=0.0146, TTL3/θ3$_m$=0.38, ER3$_{11}$/f3$_1$=−0.66, Vd3$_2$−Vd3$_3$=32 and Vd3$_5$−Vd3$_6$=31, which satisfy the above condition (11)-(15).

Figure 6A:
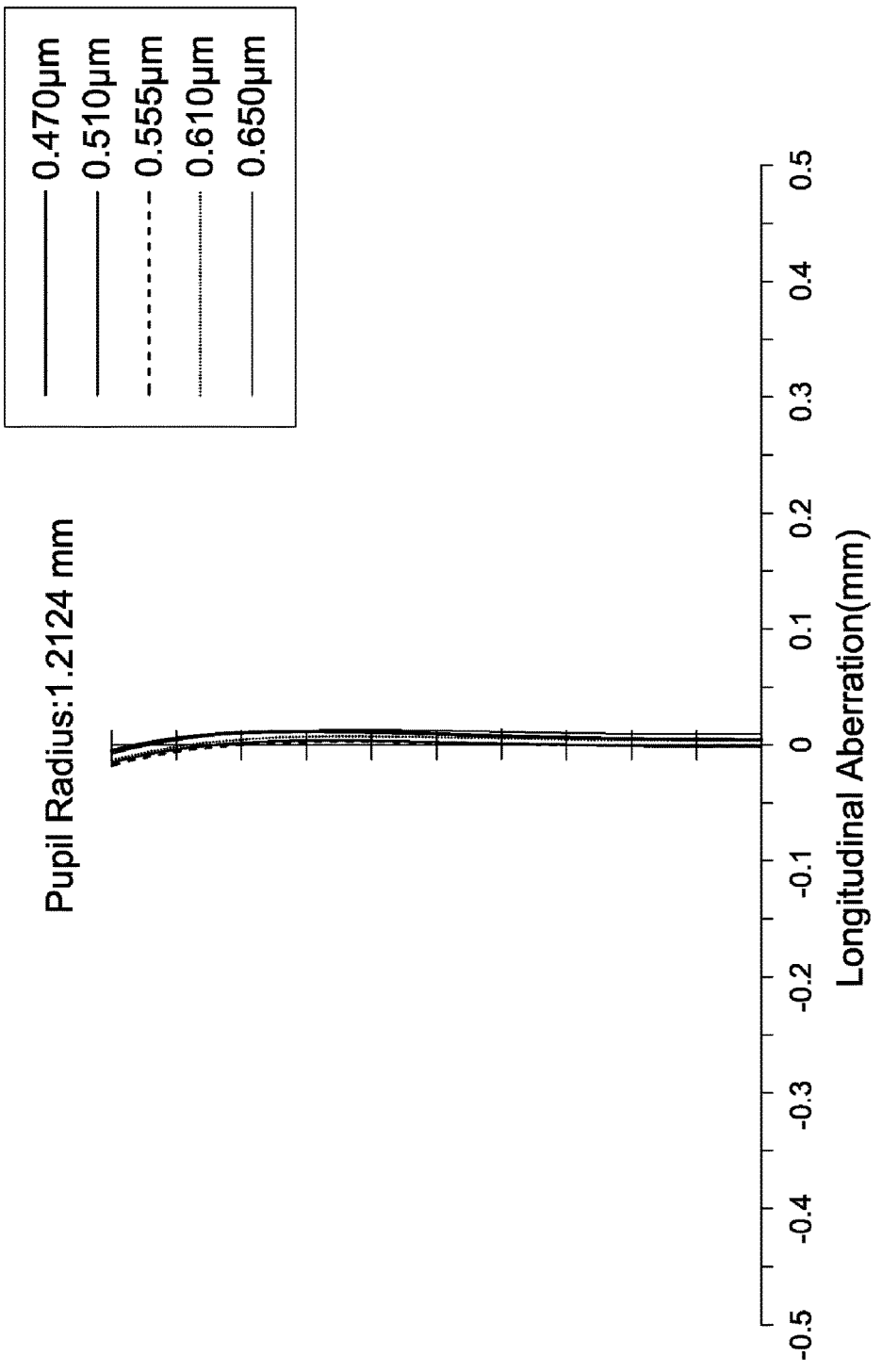
FIG. 6A is a longitudinal spherical aberration diagram of a lens assembly in accordance with the third embodiment of the invention.
Figure 6B:
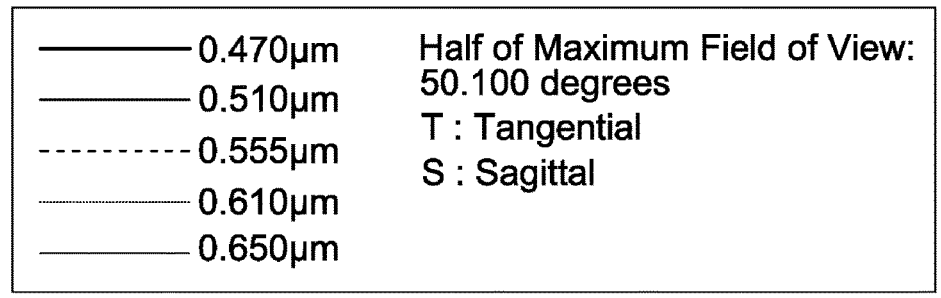
FIG. 6B is a astigmatic field curves diagram of a lens assembly in accordance with the third embodiment of the invention.
Figure 6B:
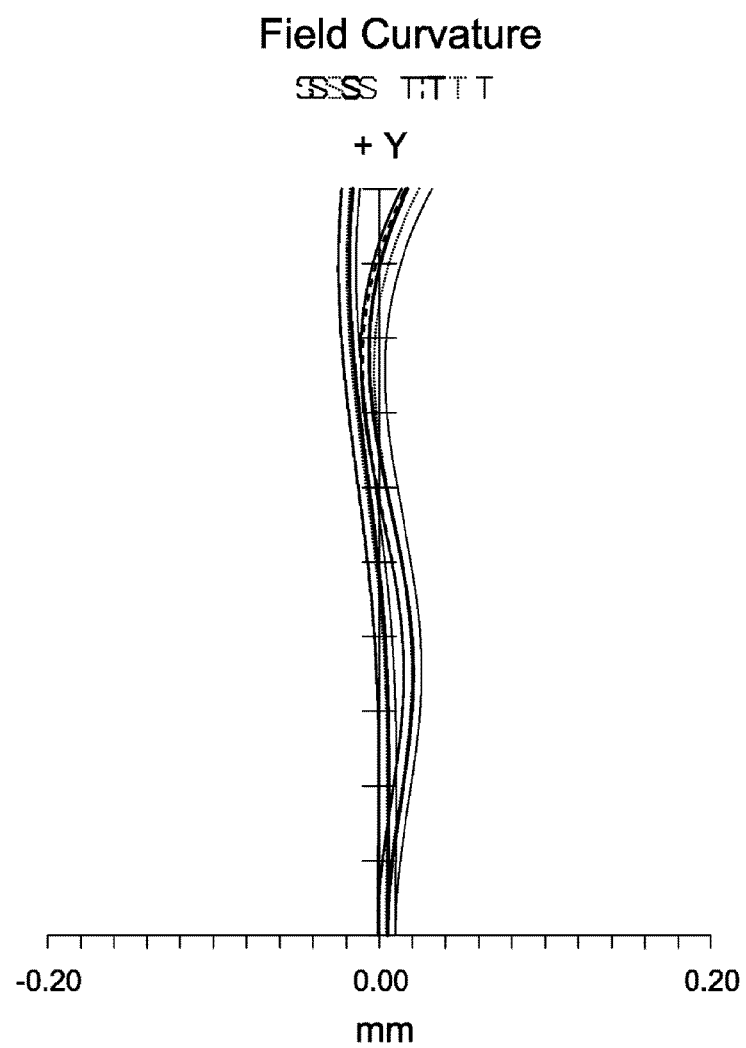
Figure 6C:
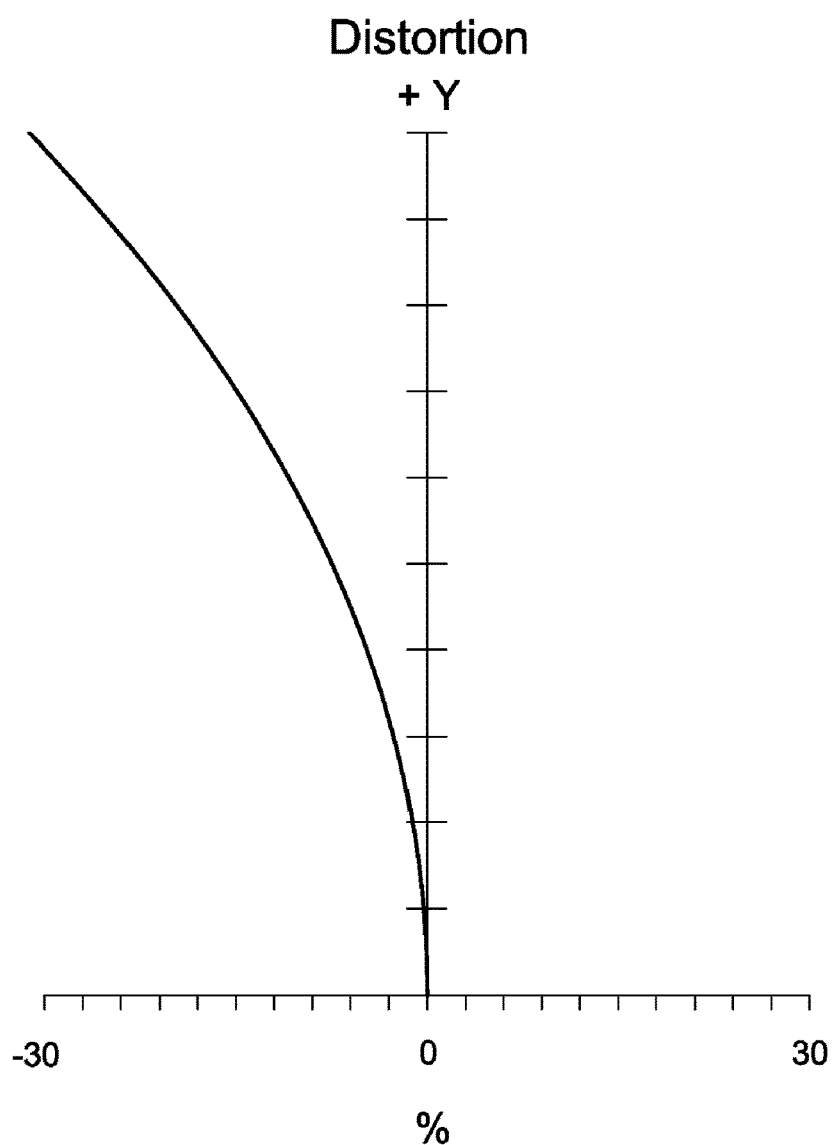
FIG. 6C is a distortion diagram of a lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows the longitudinal aberration diagram of the lens assembly 3 of the third embodiment, FIG. 6B shows the field curvature diagram of the lens assembly 3 of the third embodiment, FIG. 6C shows the distortion diagram of the lens assembly 3 of the third embodiment.

FIG. 6A shows that the longitudinal aberration in the lens assembly 3 of the third embodiment ranges between −0.05 mm and 0.05 mm for the wavelengths of 0.470 μm, 0.510 μm, 0.555 μm, 0.610 μm and 0.650 μm. FIG. 6B shows that the field curvature of tangential direction and sagittal direction in the lens assembly 6 of the third embodiment ranges between −0.04 mm and 0.04 mm for the wavelengths of 0.470 μm, 0.510 μm, 0.555 μm, 0.610 μm and 0.650 μm. FIG. 6C shows (the five lines in the figure almost coincide to appear as if one line) that the distortion in the lens assembly 3 of the third embodiment ranges between −33% and 0% for the wavelengths of 0.470 μm, 0.510 μm, 0.555 μm, 0.610 μm and 0.650 μm. It is obvious that the longitudinal aberration, the field curvature, the distortion and the lateral color of the lens assembly 3 of the third embodiment can be corrected effectively, thereby capable of obtaining good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly, in sequence from an object side to an image side along an optical axis, comprising:
   a first lens which is a meniscus lens with negative refractive power and includes a convex surface facing the object side;
   a second lens having negative refractive power and including a concave surface facing the object side;
   a third lens having positive refractive power and including a convex surface facing the image side;
   a fourth lens having positive refractive power;
   a fifth lens having positive refractive power;
   a sixth lens which is a biconcave lens with negative refractive power, and
   a seventh lens having refractive power.

2. The lens assembly as claimed in claim 1, wherein the fifth lens and the sixth lens are cemented to form a cemented lens.

3. The lens assembly as claimed in claim 2, wherein the fifth lens includes a convex surface facing the image side.

4. The lens assembly as claimed in claim 2, wherein the sixth lens includes a concave surface facing the object side.

5. The lens assembly as claimed in claim 2, wherein the lens assembly satisfies:

$$-0.7 \leq 1/Nd_1f_1+1/Nd_2f_2+1/Nd_3f_3+1/Nd_4f_4+1/Nd_5f_5+1/Nd_6f_6+1/Nd_7f_7 \leq 0.7$$

wherein $Nd_1$ is a refractive index of the first lens, $f_1$ is an effective focal length of the first lens, $Nd_2$ is a refractive index of the second lens, $f_2$ is an effective focal length of the second lens, $Nd_3$ is a refractive index of the third lens, $f_3$ is an effective focal length of the third lens, $Nd_4$ is a refractive index of the fourth lens, $f_4$ is an effective focal length of the fourth lens, $Nd_5$ is a refractive index of the fifth lens, $f_5$ is an effective focal length of the fifth lens, $Nd_6$ is a refractive index of the sixth lens, $f_6$ is an effective focal length of the sixth lens, $Nd_7$ is a refractive index of the seventh lens, $f_7$ is an effective focal length of the seventh lens.

6. The lens assembly as claimed in claim 2, wherein the lens assembly satisfies:

$$30 \leq Vd_2 - Vd_3 \leq 50$$

wherein $Vd_2$ is an Abbe number of the second lens, $Vd_3$ is an Abbe number of the third lens.

7. The lens assembly as claimed in claim 2, wherein the lens assembly satisfies:

$$25 \leq Vd_5 - Vd_6 \leq 40$$

wherein $Vd_5$ is an Abbe number of the fifth lens, $Vd_6$ is an Abbe number of the sixth lens.

8. The lens assembly as claimed in claim 1, wherein the lens assembly satisfies:

$$-0.7 \leq 1/Nd_1f_1+1/Nd_2f_2+1/Nd_3f_3+1/Nd_4f_4+1/Nd_5f_5+1/Nd_6f_6+1/Nd_7f_7 \leq 0.7$$

wherein $Nd_1$ is a refractive index of the first lens, $f_1$ is an effective focal length of the first lens, $Nd_2$ is a refractive index of the second lens, $f_2$ is an effective focal length of the second lens, $Nd_3$ is a refractive index of the third lens, $f_3$ is an effective focal length of the third lens, $Nd_4$ is a refractive index of the fourth lens, $f_4$ is an effective focal length of the fourth lens, $Nd_5$ is a refractive index of the fifth lens, $f_5$ is an effective focal length of the fifth lens, $Nd_6$ is a refractive index of the sixth lens, $f_6$ is an effective focal length of the sixth lens, $Nd_7$ is a refractive index of the seventh lens, $f_7$ is an effective focal length of the seventh lens.

9. The lens assembly as claimed in claim 1, wherein the lens assembly satisfies:

$$0.2 \leq TTL/\theta_m \leq 0.45$$

wherein TTL is total track length which is from the object side of the first lens to the image side along an optical axis, and the unit of TTL is mm, $\theta_m$ is a half of maximum field of view (FOV), and the unit of FOV is degree.

10. The lens assembly as claimed in claim 1, wherein the lens assembly satisfies:

$$-0.8 \leq ER_{11}/f_1 \leq -0.4$$

wherein $ER_{11}$ is an effective radius of the object side of the first lens, $f_1$ is an effective focal length of the first lens.

11. The lens assembly as claimed in claim 1, wherein the lens assembly satisfies:

$$30 \leq Vd_2 - Vd_3 \leq 50$$

wherein $Vd_2$ is an Abbe number of the second lens, $Vd_3$ is an Abbe number of the third lens.

12. The lens assembly as claimed in claim 1, wherein the lens assembly satisfies:

$$25 \leq Vd_5 - Vd_6 \leq 40$$

wherein $Vd_5$ is an Abbe number of the fifth lens, $Vd_6$ is an Abbe number of the sixth lens.

13. The lens assembly as claimed in claim 1, wherein the fourth lens includes a convex surface facing the image side.

14. The lens assembly as claimed in claim 1, wherein the fifth lens is a biconvex lens and the seventh lens is a biconvex lens.

15. A lens assembly, in sequence from an object side to an image side along an optical axis, comprising:
   a first lens which is a meniscus lens with negative refractive power and includes a convex surface facing the object side;
   a second lens having negative refractive power and including a concave surface facing the object side;
   a third lens having positive refractive power and including a convex surface facing the image side;
   a fourth lens having positive refractive power;
   a fifth lens having positive refractive power;
   a sixth lens having negative refractive power, and
   a seventh lens having refractive power; wherein the second lens and the third lens are cemented to form a cemented lens.

16. The lens assembly as claimed in claim 15, wherein the lens assembly satisfies:

$$-0.7 \leq 1/Nd_1f_1+1/Nd_2f_2+1/Nd_3f_3+1/Nd_4f_4+1/Nd_5f_5+1/Nd_6f_6+1/Nd_7f_7 \leq 0.7$$

wherein $Nd_1$ is a refractive index of the first lens, $f_1$ is an effective focal length of the first lens, $Nd_2$ is a refractive index of the second lens, $f_2$ is an effective focal length of the second lens, $Nd_3$ is a refractive index of the third lens, $f_3$ is an effective focal length of the third lens, $Nd_4$ is a refractive index of the fourth lens, $f_4$ is an effective focal length of the fourth lens, $Nd_5$ is a refractive index of the fifth lens, $f_5$ is an effective focal length of the fifth lens, $Nd_6$ is a refractive index of the sixth lens, $f_6$ is an effective focal length of the sixth lens, $Nd_7$ is a refractive index of the seventh lens, $f_7$ is an effective focal length of the seventh lens.

17. The lens assembly as claimed in claim 15, wherein the lens assembly satisfies:

$$30 \leq Vd_2 - Vd_3 \leq 50$$

wherein $Vd_2$ is an Abbe number of the second lens, $Vd_3$ is an Abbe number of the third lens.

18. The lens assembly as claimed in claim 15, wherein the lens assembly satisfies:

$$25 \leq Vd_5 - Vd_6 \leq 40$$

wherein $Vd_5$ is an Abbe number of the fifth lens, $Vd_6$ is an Abbe number of the sixth lens.

19. A lens assembly, in sequence from an object side to an image side along an optical axis, comprising:

a first lens which is a meniscus lens with negative refractive power and includes a convex surface facing the object side;
a second lens having negative refractive power and including a concave surface facing the object side;
a third lens having positive refractive power and including a convex surface facing the image side;
a fourth lens having positive refractive power;
a fifth lens having positive refractive power;
a sixth lens having negative refractive power, and
a seventh lens which is aspherical with positive refractive power and includes a convex surface facing the image side.

20. A lens assembly, in sequence from an object side to an image side along an optical axis, comprising:
a first lens which is a meniscus lens with negative refractive power and includes a convex surface facing the object side;
a second lens having negative refractive power and including a concave surface facing the object side;
a third lens having positive refractive power and including a convex surface facing the image side;
a fourth lens having positive refractive power;
a fifth lens having positive refractive power;
a sixth lens having negative refractive power, and
a seventh lens having refractive power; wherein a stop deposes between the third lens and the fourth lens.

* * * * *